United States Patent [19]
Buehler et al.

[11] 4,110,144
[45] Aug. 29, 1978

[54] MECHANICALLY LOCKED BELL AND SPIGOT COUPLING FOR DUCTS AND METHOD OF FORMING

[75] Inventors: Amsey Buehler; Kirk Thomas Butcher, both of Cobourg, Canada

[73] Assignee: Canadian General Electric Company Limited, Toronto, Canada

[21] Appl. No.: 781,919

[22] Filed: Mar. 28, 1977

Related U.S. Application Data

[62] Division of Ser. No. 389,780, Aug. 20, 1973, abandoned.

[51] Int. Cl.² .................... B65H 81/00; F16L 37/08
[52] U.S. Cl. .................... 156/173; 138/109; 156/157; 156/250; 285/423; 285/DIG. 20
[58] Field of Search ............ 156/157, 304, 502, 173, 156/175, 172, 169, 171; 138/DIG. 2, 117, 109; 285/DIG. 20, 423, 237, 334.4, 374, 322, 243, 236, 260, 330.2, 324, DIG. 19, 139

[56] References Cited

U.S. PATENT DOCUMENTS

| | | | |
|---|---|---|---|
| 2,420,778 | 5/1947 | Herold | 285/DIG. 20 |
| 2,702,716 | 2/1955 | Basolo et al. | 285/164 |
| 3,252,192 | 5/1966 | Smith | 285/367 |
| 3,623,930 | 11/1971 | Grosh | 156/173 |
| 3,661,670 | 5/1972 | Pierpont, Jr. | 156/175 |
| 3,775,207 | 11/1973 | Harmon | 156/173 |

*Primary Examiner*—William A. Powell
*Assistant Examiner*—Michael W. Ball
*Attorney, Agent, or Firm*—Paul E. Rochford; F. L. Neuhauser

[57] ABSTRACT

A bell and spigot coupling is provided with an abrasive-material insert to increase the disengagement force necessary to uncouple the ducting.

6 Claims, 2 Drawing Figures

MECHANICALLY LOCKED BELL AND SPIGOT COUPLING FOR DUCTS AND METHOD OF FORMING

This is a division of application Ser. No. 389,780, filed Aug. 20, 1973, now abandoned.

BACKGROUND OF THE INVENTION

This invention relates in general to pipe couplings and is more specifically directed to a novel coupling for use primarily, but not necessarily exclusively, with glass fiber ducts.

One of the major problems in laying ducts in the field, especially where the duct is to carry electrical cables, resides in the provision of couplings which require a minimum of on-the-spot machining or fitting work while affording adequate mechanical and sealing characteristics.

Glass fiber ducting is notoriously difficult insofar as machining is concerned but has become established as superior for outdoor applications due to its considerable strength, chemical resistance and the absence of corrosion problems, etc.

SUMMARY OF THE INVENTION

The present invention provides a coupling structure which limits field "machining" to the occasional cutting of duct lengths where necessary. In other words, the invention provides a coupling structure wherein all the sealing and retaining components can be embodied in the ends of piping during manufacture; hence, in the field, even undressed pipe, of appropriate diameter, can be inserted and coupled without any special preparation or machining.

BRIEF DESCRIPTION OF THE DRAWING

The invention will be more readily appreciated and understood from the following detailed description taken in conjunction with the appended drawings, wherein:

With reference to FIG. 1, it will be seen that the novel coupling structure derives from the well-known bell and spigot type.

DESCRIPTION OF THE PREFERRED EMBODIMENT

Figure 1:
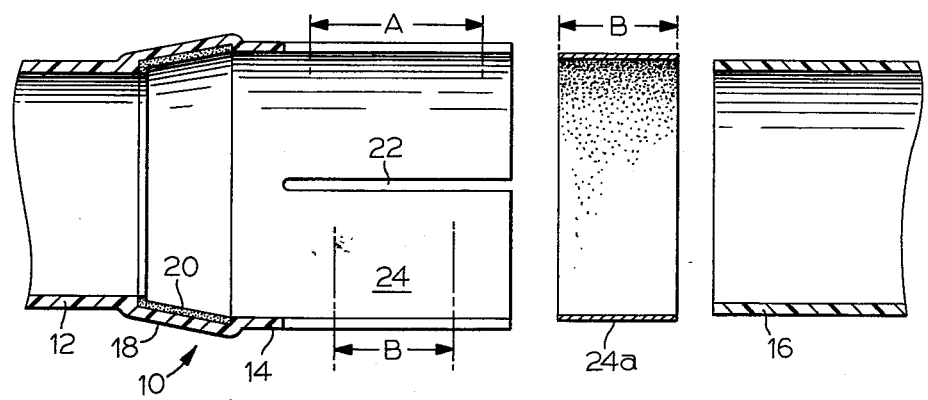
FIG. 1 is an exploded cross-sectional view through a coupling according to one embodiment of the invention, and, FIG. 2 is a view of an assembled coupling partly cut away to reveal the sealing ring and the abrasive sleeve.

Reference numeral 10 generally designates a length of duct 12 at one end of which a bell 14 is formed. Reference numeral 16 designates the "spigot" end of a second length of duct which is to be coupled to duct 10. The spigot may be undressed, i.e. as manufactured, or may be in a sanded or ground condition.

Internally of the rearmost portion or neck 18 of bell 14, an elastomeric sealing ring 20 is located, this seal, in cross-section, may have a frusto-conical shape with the inner surfaces forming an inclined abuttment surface against which the end of the spigot is forced upon assembly of the duct sections 10 and 16. Naturally, other types of seals can be employed without departing from the spirit of the present invention. Further, it will be appreciated that the neck portion 18 could be non-conical and be of the abrupt or direct transition type.

The sealing ring 20 can be of any suitable material such as elastomeric urethane and can be inserted into a previously formed bell or, by positioning on a winding mandrel, can be integrated into the bell during manufacture of the latter.

With further reference to FIG. 1, the bell wall is slotted as at 22. Preferably, as shown in the illustrative embodiment, a plurality of slots 22 are formed in equi-spaced relation around the periphery of the bell wall. Testing reveals that a single slot of suitable width could also be used, but a number of slots is more effective. These slots 22 extend from the bell mouth through a distance sufficient to located the inner ends of the slots inwardly of, (beyond), the area "A" within and around which an external clamping means (not shown) can be positioned. The width of slots 22 is not of any great criticality but should be such as to preclude abuttment of opposed slot walls when clamping pressure is applied around area "A" to engage the bell and spigot surfaces. This, of course, applied also where a single slot is used.

In accordance with the invention, an inner bell wall portion 24, of length "B", is characterized, broadly speaking, by a substantially rough and generally abrasive surface finish, such finish being obtainable in several different ways. The specific characteristics of such surface finish depend upon the requirements for any given situation since it has been found that varying the wall surface in question from a relatively smooth or natural finish to a rough and very abrasive finish produces unexpectedly high increases in the axial force necessary to separate the assembled bell and spigot. For example, actual tests have shown as follows:

| Condition of Bell and/or Spigot | Axial Separation Force |
|---|---|
| 1. Coupling effected in natural state (not clamped). | 200 lbs. |
| 2. Bell and spigot in natural state with external mechanical clamp. | 700–850 lbs. |
| 3. Spigot outer surface roughened as by coarse sanding - assembly clamped. | 1,100–1,190 lbs. |
| 4. Emery grit between mating duct surfaces - assembly clamped. | Approx. 2,400 lbs. |

From the above examples, it will be appreciated that the provision of a rough and substantially abrasive surface results in a dramatic increase in coupling efficiency, which, of course, ensures maintenance with regard to sealing effectiveness and integrity of assembly.

In order to obtain the optimum high separation force required to disassemble a coupling embodying the present invention, a sleeve 24a of double-sided emery cloth of suitable grit size, (say 80 grit) can be inserted in the bell during assembly. It will be noted that a single-sided emery cloth could be cemented to the bell inner surface as one obvious alternative. However, a preferred method is to locate emery cloth on the bell mandrel and form the bell portion of the duct with such emery cloth in situ. Clearly, the grit surface could be applied to the spigot with comparable results, however, to simplify field work where field-cut duct sections are often necessary, it is preferable to incorporate the treated surface within the bell section.

Depending upon the precise nature of the duct material, an effective coupling surface can also be produced inside the bell by knurling the bell mandrel. This will produce, during manufacture, a plurality of substantially pointed and inwardly directed protrusions which engage the spigot surface upon assembly to provide an increase in holding characteristics as compared with the normal and relatively smooth surface.

Figure 2:
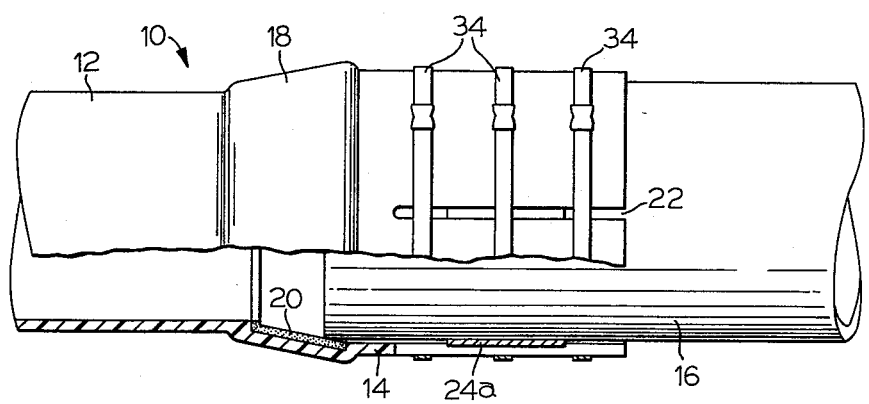

Specifically, with reference to FIG. 2, the preferred method of manufacture calls for location of sealing ring 20 on mandrel 26 at the appropriate neck portion 18a. Similarly, abrasive element 24a is located on the bell-forming portion 28 of mandrel 26, the abrasive side or face of element 24a being in direct contact with the mandrel surface.

As mandrel 26 is rotated, reinforcing fiber is drawn from a number of coils 30 and after being passed through a plastic resin bath, the fibers are constrained to wrap around the mandrel in overlapping reverse spiral patterns by reciprocating eyelets 32. The winding is continued until the entire mandrel surface has been covered to a predetermined thickness.

As previously mentioned, the seal 20 can be of any suitable material such as elastomeric urethane. Preferably, an injection molding grade of polyurethane is employed since the latter can withstand the curing temperature of the resin and is highly resistant to abrasive conditions. Further, such preferred material has excellent resilience properties.

The abrasive sleeve may preferably consist of an aluminum oxide coated backing material, although several other sleeve materials will be obvious to those skilled in the art.

FIG. 2 shows an embodiment of the invention wherein three clamping members 34 of the metal strap type, have been used. It will be appreciated that the only initial feature at this point is clamping efficiency, and that the number and type of clamps used is governed only by the obtaining requirements for a desired efficiency, availability and economics, etc.

In the preferred form of the present invention, assembly or coupling in the field is easily effected. With the sealing means and retaining means both incorporated into the bell section, it may only be necessary to carry out a single length-cutting step at the spigot end, the latter end then being inserted into the bell section to abutt the seal. Clamping means is then applied around the outer surface of the bell section to finally secure the coupling assembly.

Insofar as clamping means are concerned, this is really a matter of choice. Examples of such means are gear-type clamps; heat shrinkable sleeves; sleeves having tapered or "cammed" inner surfaces, and steel tape of the type commonly used to strap crates, etc. When using steel tape it has been found advisable to used a tensioning device which is capable of applying a constant force as opposed to the stroke or ratchet type. This ensures that crimping of the tape can be carried out when the correct tension has been applied. Using a ratchet device it may be found that the correct tension force occurs midway through a given stroke necessitating easing-off to the last stop before crimping.

From the foregoing, it will be appreciated by those skilled in the art, that many modifications and changes can be effected, without departing from the spirit and scope of the present invention. Accordingly, reference is made to the appended claims wherein the scope of the inventive contribution is defined.

What is claimed as new and desired to be secured by Letters Patent of the United States is:

1. The method of manufacturing a plastic duct having a bell coupling formation integral therewith comprising the steps of:
   (a) providing a mandrel having a duct forming section; a bell forming section; and a neck section interconnecting said duct and bell forming sections;
   (b) locating an elastomeric sealing means around said neck section;
   (c) providing abrasive means around at least a portion of said bell forming section;
   (d) winding glass fiber roving coated with uncured epoxy resin around said mandrel sections to form a predetermined wall thickness;
   (e) curing the epoxy resin,
   (f) removing the duct and bell coupling formation with the integral elastomer sealing means and abrasive means, and
   (g) forming at least one axially aligned slot in the wall of the bell coupling formation.

2. The method of claim 1 wherein said elastomeric sealing means is constructed from a polyurethane.

3. The method of claim 1 wherein said abrasive means comprises a sleeve the inner wall of which is coated with abrasive grit.

4. The method of claim 3 wherein the elastomeric sealing means is constructed from polyurethane.

5. The method of claim 1 wherein said neck section is frusto-conical.

6. The method of claim 5 wherein the elastomeric sealing means is constructed from polyurethane.

* * * * *